Dec. 27, 1960 E. J. GARGINI 2,966,544
COLOUR TELEVISION RECEIVERS, AND REPRODUCING TUBES THEREFOR
Filed Dec. 13, 1957 2 Sheets-Sheet 1

Inventor
E. J. Gargini
By Glascock Downing & Seebold
Attys

Inventor
E. J. Gargini
By Glascock Downing & Seebold
Attys.

United States Patent Office 2,966,544

Patented Dec. 27, 1960

2,966,544

COLOUR TELEVISION RECEIVERS, AND REPRODUCING TUBES THEREFOR

Eric John Gargini, West Drayton, England, assignor to Electric & Musical Industries Limited, Hayes, Middlesex, England, a company of Great Britain Filed Dec. 13, 1957, Ser. No. 702,627

Claims priority, application Great Britain Dec. 19, 1956

10 Claims. (Cl. 178—5.4)

Figure 1:
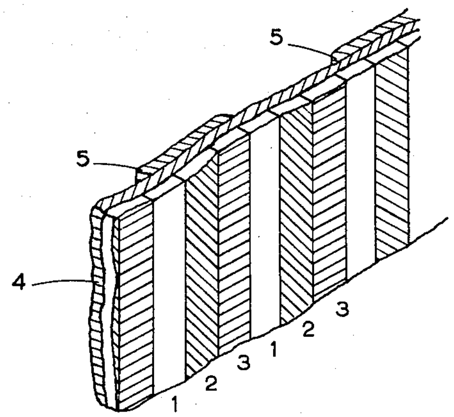

This invention relates to colour television receivers and reproducing tubes therefor.

In the complete specification of co-pending United States application Serial Number 672,458 there is described a colour television receiver having a cathode ray image reproducing tube the luminescent screen of which comprises an array of parallel phosphor strips transverse to the line scanning direction and emitting different colours when excited by the cathode ray beam, and means for producing colour variations in a reproduced picture by modulating the scanning velocity of the beam in the line scanning direction. The phosphor strips are, for example arranged in groups of three, each group consisting of a red phosphor, a green phosphor and a blue phosphor and the modulation of the scanning velocity of the beam is preferably produced by superimposing on the normal line scanning sawtooth waveform, a sawtooth waveform of higher frequency. The average frequency of this superimposed sawtooth waveform corresponds to the triplet frequency, that is the frequency with which the beam transverses the groups of phosphor strips but the superimposed waveform is modulated in phase by a signal representing the hue to be reproduced, and is modulated in amplitude by a signal representing the saturation of the respective hue. The theoretical basis for the reproduction of colour pictures by this velocity modulation technique is described in the aforesaid complete specification.

To obtain accurate colour reproduction it is obviously necessary that there should be an accurate relationship between received colour information and the deflection of the beam, so that the phosphor strip on which the beam is caused to impinge at any instant is determined by the received signals. When the velocity modulation technique is employed as indicated, difficulty is experienced in generating by known techniques the indexing signal which, being indicative of the position of the beam at the respective time, can be used for obtaining a desired relationship, since the velocity of the beam is not constant and should theoretically be infinite at some instants.

The object of the present invention is to reduce this indexing problem which arises with the employment of modulation of the scanning velocity of the beam.

According to the present invention there is provided a colour television receiver according to claim 1 of the aforesaid complete specification wherein said reproducing tube includes secondary-electron emitting material associated with the luminescent screen in such a manner that the electron beam releases secondary electrons differentially when directed at each phosphor strip in cyclically selected groups of said strips, and means are provided responsive to said differential secondary electron emission for relating the modulation of the scanning velocity of the beam to the instantaneous position of the beam as each line is scanned.

Preferably secondary-electron emitting material is provided over and in substantially co extensive relationship with alternate groups of phosphor strips on the luminescent screen. In a practical case, the secondary electron emitting material may be deposited on the aluminium or other metal backing which is normally provided on the luminescent screen and a signal corresponding to the secondary electron emission can be derived from a collector electrode in the tube arranged to collect secondary emission from the secondary electron emitting material, or alternatively from the aluminium or other metal backing.

Figure 3:
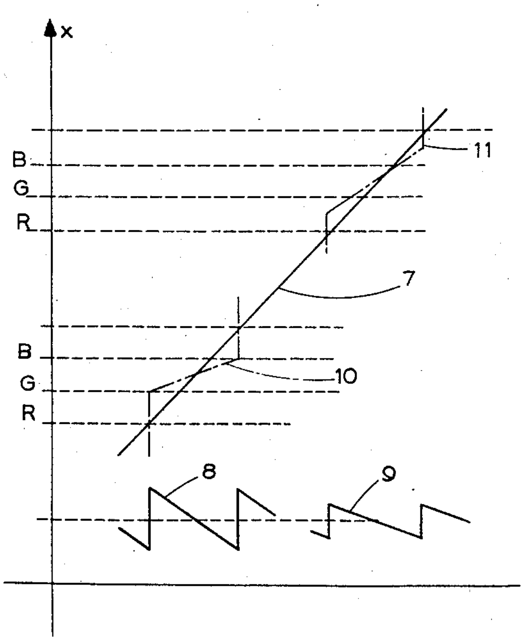
Figure 2:
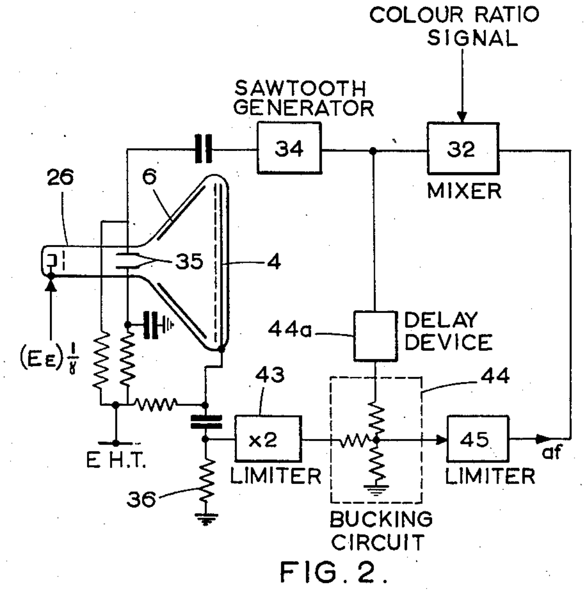
Figure 4:
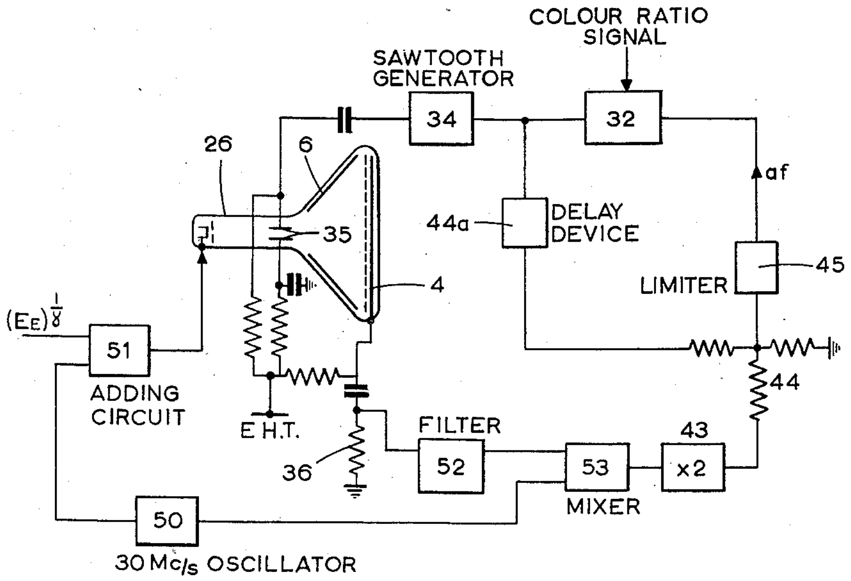

In order that the present invention may be clearly understood and readily carried into effect, the invention will be described with reference to the accompanying drawings, in which:

Figure 1 illustrates diagrammatically a fragment of the luminescent screen of an image reproducing tube used in a receiver according to the present invention, Figure 2 illustrates one example of part of a television receiver according to the present invention, Figure 3 is a diagram explanatory of the operation of the reproducing tube, and Figure 4 illustrates a modification of Figure 2.

The screen of the image reproducing tube which is illustrated in Figure 1 comprises a luminescent screen consisting of an array of parallel strips of phosphors emitting different colours when excited by the cathode ray beam. The strips are arranged cyclically in groups of three, each group being called a triplet and consisting of a red strip 1, a green strip 2 and a blue strip 3. The luminescent screen is backed by an aluminium or other metal film in known manner and indexing strips 5 of a substance, for example magnesium oxide, having a higher secondary electron co-efficient than the metal of the backing film, are deposited as indicated over alternate phosphor triplets. The secondary electron emitting material is also arranged to extend beyond the vertical edges of the screen.

In the receiver which is illustrated in Figure 2, the reproducing tube which embodies the screen illustrated in Figure 1 is denoted by the reference 26 and it has an annular electrode 6 separate from and in operation maintained at a somewhat higher potential than the backing film 4, so that it collects secondary electrons released from the backing film 4 or the indexing strips 5 by the scanning beam. Moreover because of the indexing strips 5, the beam releases secondary electrons preferentially when directed at each phosphor strip in alternate triplets so that the current from the backing film 4 to the electrode 6 exhibits impulsive variations which give information about the instantaneous position of the beam during a line scan.

The input circuit of the receiver is not shown in Figure 2 as it may be of the same general construction as described in the aforesaid complete specification. For the purpose of the present description it is sufficient to indicate that there is set up by the input circuit a brightness signal denoted by $$(E_E)\frac{1}{\gamma}$$

and defined by $$(E_E)\frac{1}{\gamma}=\frac{E_R+E_G+E_B}{3}\frac{1}{\gamma}$$

and a symmetrical colour ratio signal defined by $$\frac{E_R}{E_E}\cos\omega_c t+\frac{E_G}{E_E}\cos\left(\omega_c t+\frac{2\pi}{3}\right)+\frac{E_B}{E_E}\cos\left(\omega_c t+\frac{4\pi}{3}\right)$$

The symmetrical colour ratio signal may be regarded as a vector the phase of which represents the hue of the image points, of which the intensity is represented by the amplitude of the brightness signal. Moreover the amplitude of this vector represents the colour saturation of the respective image points. In the foregoing expressions the symbols $E_R$, $E_G$ and $E_B$ have the usual significances. The brightness signal is applied to the cathode of the image reproducing tube 26 whilst the colour ratio signal is applied to a mixing circuit 32. There is also applied to the mixing circuit 32 a reference signal of a frequency *af* namely the triplet frequency for the tube 26. This frequency, it will be understood, may vary due to scanning non-linearity and other irregularities in the operation of the tube. The construction of the mixer circuit 32 is described in the aforesaid complete specification and it transposes the phase and amplitude modulation of the symmetrical colour ratio signal on to the reference signal, so that there is derived a signal of centre frequency *af* but phase modulated to represent hue and amplitude modulated to represent saturation. The mixing circuit 32 corresponds to the components bearing the reference numerals 29 to 46 of the aforesaid complete specification.

The output of the mixing circuit 32 is applied to a sawtooth waveform generator 34 to generate a sawtooth waveform synchronised with the applied circuit and exhibiting similar phase and amplitude modulations. The output of the generator 34, fragments of which may be represented by 8 and 9 in Figure 3 which will be referred to subsequently, is applied between electrostatic deflecting plates 35 biassed to E.H.T. The deflecting plates 35 may be additional to the normal deflecting means for the tube 26 which latter may comprise deflecting coils. The plates 35 are arranged to produce deflection in the line scanning direction, and the output of the generator 34 thus superimposes a wobble on the line scanning deflection of the beam. The effect of this wobble, taken in conjunction with the modulation of the beam intensity produced by the brightness signal is to cause the reproduction of coloured images on the screen of the tube 26.

To illustrate this effect, the straight line 7 in Figure 3 represents a fragment of the normal line scanning waveform applied to the image reproducing tube 26, the abscissae in Fig. 3 representing time and the ordinates representing horizontal deflection. The ordinate increments cut off by the dotted lines in Figure 3 represent phosphor strips on the screen of the tube, the colours being as indicated, and it will be observed that when the scanning waveform is linear, the beam takes equal times to cross the different strips and will therefore reproduce white, the phosphor efficiencies being adjusted to produce white in manufacture, when the strips are equally excited. In the absence of a wobble component of deflection the tube will therefore reproduce the image represented by received signals in monochrome. However in accordance with the invention, a wobble component is superimposed on the line scanning waveform when a colour has to be reproduced, the wobble component being of symmetrical sawtooth waveform. The average frequency of the wobble component is the triplet frequency, that is the frequency with which the beam traverses the triplets of phosphor strips 1, 2, 3 assuming a constant line scanning velocity, though the wobble component is modulated in phase and in amplitude. Fragments of the wobble component at two different times are represented by the waveform portions 8 and 9 and it will be noted that these portions are of different amplitude. It is however to be assumed that they are of the same phase with respect to the passage of the beam over the phosphor triplets. The amplitude of the portion 8 is determined so that the slope of the long flank is approximately ⅔ of the inverse slope of the normal line scanning waveform 7. Therefore if the waveform 8 is superimposed on the waveform 7 the resultant waveform is that represented by the dotted line 10. Assuming that the spot diameter is small compared with the width of the phosphor strip the beam will now dwell for practically the whole of a period of the wobble component on a green strip and will pass virtually instantaneously across the adjacent red and blue strips. The beam will therefore tend to reproduce a saturated green. If the amplitude of the wobble is reduced to 50% without altering the phase as depicted at 9, the resultant waveform now corresponds to the dotted line 11. The beam now dwells on all three strips of the respective triplet, but is longer on the green strip than on the blue and red strips, the time ratio depending on the amplitude of the wobble. In the circumstances represented by 11 the beam will reproduce an unsaturated green, namely approximately 50% saturated, indicating a simple relationship between the amplitude of the wobble component, and the saturation of the emitted colour. It should also be clear from Figure 3 that by modulating the phase of the wobble component relative to the passage of the beam over the phosphor triplets the position of the dwell on each triplet can be shifted so that the hue which is reproduced is changed. For example, if the inclined part of the waveform 11 is displaced to cross the red and green strips only, a maximally saturated yellow would be reproduced. Consequently by modulating the wobble component in phase in accordance with the hue component of the received signals and by modulating the amplitude of the wobble component in accordance with the saturation component of received signals colour reproduction can occur.

From the description of Figure 3 it will be evident that the cycles of the sawtooth waveform derived from the generator 34 must be accurately timed in relation to the passage of the beam over the phosphor strips, otherwise inaccurate colour reproduction can occur. In order that the necessary accuracy can be obtained, an indexing signal is derived from a resistor 36 in the current lead to the backing film 4. The signal set up across the resistor 36 exhibits impulsive variations corresponding to the differential secondary emission from the indexing strips 5 compared with the backing film 4, and the average fundamental frequency of the indexing signal is therefore half the triplet frequency. However the indexing signal is also modulated in phase due to the sawtooth waveform caused by the deflecting plates 35 and is furthermore modulated in amplitude in dependence upon the beam current, which is modulated in response to the brightness signal. The indexing signal from the resistor 36 is first passed to a frequency doubling and amplitude-cancelling circuit 43, which is shown only in block form. The amplitude-cancelling portion of the circuit 43 takes the form of a gain controlled stage, the gain of which is controlled by a signal representing $1/E_E$ to cancel the effect of the amplitude modulation produced by brightness modulation of the beam current due to the signal $$(E_E)\frac{1}{\gamma}$$

The frequency doubling portion of the circuit 43 produces an oscillation the average frequency of which is therefore twice that of the indexing signal and equal to the triplet frequency which contains only the fundamental frequency and the side bands corresponding to the phase modulation. The resultant oscillation is passed to a bucking circuit 44 to which is applied, in phase opposition to the output of the circuit 43, the signal from the mixing circuit 32, the latter signal being first passed through the delay device 44a to ensure the correct phase relationship of the two signals applied to the bucking circuit. The action of the bucking circuit is to cancel the side bands of the indexing signals due to the colour positioning "wobble" signal and the resultant indexing signal, the phase of which is now representative substantially only of the position of the beam as desired, is passed through a simple amplitude limiter 45 to remove those amplitude variations which are produced by the hue signal derived from the circuit 32 or those which occur when phase cancellation is introduced. The signal produced by the limiter 45 is the reference signal of triplet frequency *af* referred to above and the signal which is applied to the mixing circuit 32. Inasmuch as secondary-electron emitting material is deposited over all the whole area of alternate triplets of the luminescent screen and extends beyond the edge of the screen, an indexing signal is produced with reliability at half triplet frequency unless the scanning beam is cut off. Moreover the position modulation of the indexing signal due to the phase modulation of the sawtooth waveform applied to the plates 35 is a simple linear function and the latter first modulation can be cancelled by a simple bucking circuit as described.

It is advantageous to employ a notch filter in the brightness signal channel to reduce the effect of brightness signal transients on the triplet frequency derived from the annular electrode 6.

If the spacing of the colour stripes and hence indexing elements in the tube 26 is not exactly uniform, and if the scanning waveform 7 is non-linear, frequency variations will be produced in the indexing signal derived from the resistor 36 which produce "tracking" changes in the waveform applied to the deflecting plates 35. It is desirable that the indexing phase control be operative instantaneously so that this tracking may operate instantaneously. However some delay is inevitable due to the finite band widths of the control circuits consequently a phase adjusting network is inclined in the mixing circuit 32 so that the phase delay can be adjusted to be multiples $2\pi$ radians.

The indexing strips 5 need not be deposited over alternate triplets as indicated in Figure 1, provided they are deposited over cyclically selected triplets. They may for example be deposited over every third triplet. In this case the fundamental frequency of the indexing signal derived in response to the differential secondary electron emission will be ⅓ triplet frequency and the circuit 43 would then be required to multiply by three.

In the arrangement described, the impulsive variations produced in the indexing signal in response to the differential secondary emission may in some cases be masked by variations due to the modulation of the intensity of the cathode ray beam produced by the brightness signal. The modified receiver illustrated in Figure 4 includes features intended to reduce this masking effect, and as illustrated in Figure 4, there is added to the brightness control beam a component which varies at a substantially higher frequency than the highest video frequency to be reproduced. The frequency of this oscillation is for example of 30 mc./s. and is derived from an oscillator 50 and combined with the brightness control circuit in an adding circuit 51. Assuming that the cathode ray beam in the tube 26 traverses the phosphor triplets with an average frequency of 6 mc./s., the beam traverses the indexing strips 4 with an average frequency of 3 mc./s. This frequency is however dependent upon non-linearity in the line scanning waveform and irregularity in the spacing of the indexing strips. Consequently an indexing signal is set up across the resistor 36 which comprises a carrier wave having a frequency corresponding to the oscillations from the oscillator 50 and modulated in amplitude in response to the preferential secondary electron emission of the indexing strips 4. The carrier wave therefore has a spectrum of side bands including side bands having frequencies of about 27 mc./s. and 33 mc./s. The indexing signal from the resistor 36 is applied to a filter 52 which is tuned to select the lower of its side bands although the upper of these side bands can also be used. The selected side band is then applied to a mixing circuit 53 together with some oscillation from the oscillator 50 and the output of the mixing circuit 53 includes an oscillation having an average frequency of about 3 mc./s. This oscillation corresponds to the indexing signal derived from the indexing signal 36 in Figure 2 and is applied to the circuit 43 in the same way as in the arrangement of Figure 2. However in this the amplitude-cancelling portion of the circuit 43 is a simple amplitude limiter. The remaining parts of Figure 4 are the same as the parts bearing the corresponding numerals in Figure 2.

What I claim is:

1. A colour television receiver comprising a cathode ray image reproducing tube having a luminescent screen, means for scanning said screen with the cathode ray beam of said tube according to a raster comprising a series of spaced lines, said screen comprising an array of parallel phosphor strips transverse to the direction of said lines and arranged regularly in groups, the strips of each group emitting different colours when excited by the cathode ray beam, secondary electron emitting material deposited in registry with cyclically selected groups of said strips, any two of which selected groups are spaced by at least one other group of said strips, to cause the cathode ray beam to release more secondary electrons when directed at the strips of some groups than when directed at the strips of other groups, means for modulating the intensity of said cathode ray beam in response to brightness information contained in received signals, means for deriving in response to secondary electron emission caused by said cathode ray beam a signal of variable phase and substantially uniform amplitude, means for deriving a second signal of variable phase representative of desired variations of the scanning velocity of said cathode ray beam in the direction of said lines, means for subtracting said second signal from said signal derived in response to secondary electron emission to derive a reference signal the phase modulation of which is related to the times at which said cathode ray beam crosses said groups of phosphor strips, means for deriving from received signals a hue signal which is phase modulated in accordance with hue variations of the picture represented by received signals, means for transposing the phase modulation from said hue signal to said reference signals to produce a modulating signal, and means for producing desired variations of the scanning velocity of said cathode ray beam along said lines at times responsive to said modulating signal, thereby to reproduce coloured pictures corresponding to received signals.

2. A receiver according to claim 1, said means for deriving said signal in response to secondary electron emission comprising means for multiplying the fundamental frequency of variations of the secondary cathode ray emission caused by said electron beam, to derive a signal whose fundamental frequency is that with which the electron beam crosses the groups of phosphor strips.

3. A colour television receiver comprising a cathode ray image reproducing tube having a luminescent screen comprising an array of parallel phosphor strips transverse to the line scanning direction and arranged regularly in groups, the strips in each group emitting different colours when excited by the cathode ray beam; secondary electron emitting material deposited in registery with cyclically selected groups of said strips, any two of which selected groups are spaced by at least one other group of said strips to cause the cathode ray beam to release more secondary electrons when directed at the strips of some groups than when directed at the strips of other groups; means for producing from received television signals a first signal variable to represent the brightness of the picture to be reproduced, and a second signal the phase of which is variable to represent the hue of the picture to be reproduced; means for modulating the intensity of the cathode ray beam in response to said first signal; means for producing a line scanning waveform for the cathode ray beam having a first substantially linear component periodic at the line scanning frequency, thereby to tend to cause the beam to cross the groups of phosphor strips with a predetermined frequency, and a second component periodic at a centre frequency equal to said predetermined frequency and modulated in phase in response to the phase variations of said second signal, whereby said cathode ray beam is caused to excite a selected strip or selected strips in each group of said phosphor strips but to dwell on each group for a substantially constant time; means responsive to secondary electron emission caused by the cathode ray beam for deriving a signal having a centre frequency equal to said predetermined frequency and having a phase related to the times at which the beam crosses the groups of phosphor strips; means including means for substracting said second signal from said signal derived in response to secondary electron emission to derive a reference signal any phase variations of which are representative substantially only of irregularities in the scanning of the groups of phosphor strips; said means for producing said second signal being arranged to produce phase variations of said second signal with reference to the phase of said reference signal.

4. A receiver according to claim 3 comprising means for deriving an oscillation having a frequency above the highest frequency of said second signal means for modulating the intensity of said cathode ray beam in response to said oscillation to cause the secondary electron emission caused by said electron beam to exhibit variations corresponding to a carrier wave having side bands representative of scanning irregularities, said means for deriving said signal in response to secondary electron emission including means for deriving an output from said tube corresponding to the secondary electron emission, means for selecting a side band of said output, and means for mixing the selected side band with a portion of said oscillation.

5. A receiver according to claim 3 wherein said secondary electron emitting material is deposited in strips substantially co-extensive with alternate groups of said phosphor strips.

6. A receiver according to claim 3 comprising means for modulating the intensity of said cathode ray beam at a frequency above the highest frequency of said first signal, to cause the secondary electron emission caused by said cathode ray beam to exhibit variations corresponding to a carrier wave having side bands representative of scanning and other receiver irregularities, said means for deriving said signal in response to secondary electron emission including means for selecting a side band of said carrier wave.

7. A receiver according to claim 3, said means for deriving said reference signal including means for limiting the amplitude of the resultant obtained by subtracting said second signal from said signal derived in response to secondary electron emission.

8. A receiver according to claim 3, said means for producing said second signal including means for modulating the amplitude of said second signal to represent the colour saturation of the picture to be reproduced.

9. A receiver according to claim 3, said means for deriving said reference signal including means for causing amplitude modulation of said reference signal due to modulation of the intensity of the cathode ray beam.

10. A colour television receiver comprising a cathode ray image reproducing tube having a luminescent screen comprising an array of parallel phosphor strips transverse to the line scanning direction and arranged regularly in groups, the strips in each group emitting different colours when excited by the cathode ray beam; secondary electron emitting material deposited in registry with cyclically selected groups of said strips, any two of which selected groups are spaced by at least one other group of said strips to cause a cathode ray beam to release more secondary electrons when directed at the strips of some groups than when directed at the strips of other groups; means for producing from received television signals a first signal variable to represent the brightness of the picture to be reproduced, and a second signal the phase of which is variable to represent the hue of the picture to be reproduced, means for modulating the intensity of the cathode ray beam in response to said first signal; means for producing a line scanning waveform for the cathode ray beam having a first substantially linear component periodic at the line scanning frequency, thereby to tend to cause the beam to cross the groups of phosphor strips with a predetermined frequency, and a second component periodic at a centre frequency equal to said periodic frequency and modulated in phase in response to the phase variations of said second signal, whereby said cathode ray beam is caused to excite a selected strip or selected strips in each group of said phosphor strips but to dwell in each group for a substantially constant time; means for deriving an indexing signal in response to the secondary electron emission by the cathode ray beam; means for multiplying the frequency of said indexing signal to derive a frequency-multiplied signal having a centre frequency equal to said predetermined frequency and a phase related to the times at which the beam crosses the group of phosphor strips; means including means for subtracting said second signal from said frequency multiplied signal to derive a reference signal any phase variations of which are representative substantially only of irregularities in the scanning of the groups of phosphor strips; said means for producing said second signal being arranged to produce the phase variations of said second signal with reference to the phase of said reference signal.

References Cited in the file of this patent

UNITED STATES PATENTS

| | | |
|---|---|---|
| 2,723,306 | Creamer | Nov. 8, 1955 |
| 2,763,715 | Fromm | Sept. 18, 1956 |
| 2,771,504 | Moore et al. | Nov. 20, 1956 |
| 2,773,118 | Moore | Dec. 4, 1956 |
| 2,877,295 | Loughlin | Mar. 10, 1959 |